Figure 1:
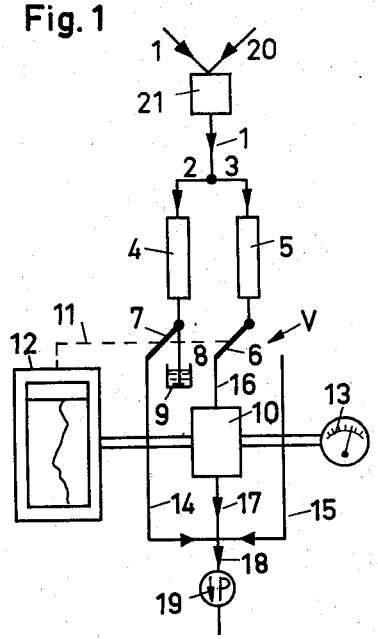

July 12, 1960    H. ENGELHARDT    2,944,418
INSTRUMENT FOR GAS ANALYSIS
Filed April 13, 1956

United States Patent Office 2,944,418
Patented July 12, 1960

2,944,418

INSTRUMENT FOR GAS ANALYSIS

Heinz Engelhardt, Frankfurt am Main, Germany, assignor to Hartmann & Braun Aktiengesellschaft, Frankfurt am Main, Germany, a corporation of Germany Filed Apr. 13, 1956, Ser. No. 578,074

2 Claims. (Cl. 73—27)

This invention relates to an instrument for the analysis of gas mixtures having constituents which absorb or yield oxygen by chemical reaction. The most important of such reactions is doubtless combustion, which plays a great part in almost all industrial installations. The analyses of gas mixtures for combustible constituents are therefore of great importance. For example, the analysis of flue gases from furnaces not only is concerned with the oxygen content as an indication of the amount of air intake, but more especially with content of unburned components in the gases, since they represent an unrealized heating value. In the treatment where the material in the mixture burns at low temperature the component is burned in a combustion chamber and the heating effect noted. This can be done by measuring the change of resistance of a wire due to the temperature alterations.

For materials or fuels, which have a high combustion temperature, such as methane and other hydrocarbons, these heat effect instruments are generally not readily obtainable or are inaccurate. Combustion catalysers must be especially prepared and have known disadvantages. Heated wire instruments are not accurate at temperatures of about 1000° C. because the resistance varies in uncontrollable ways at these temperatures reached in the burning of the hydrocarbons.

This invention is for an instrument by which such determinations are made possible simply and exactly. It relates to a process for the analysis of gas mixtures with respect to components, which in a chemical reaction taking place in a reaction chamber, yield oxygen or combine with oxygen taken from a supply. According to the invention the change in oxygen content of the gas mixture following such a reaction is indicated and registered, either as a measure of oxygen combination or evolution, and in the first case, the combination or absorption is a measure of the heating value of the gas mixture.

These instruments are not only practical for the determination of combustible components in gas mixtures but are good generally for the determination of oxygen absorbing or oxygen yielding components, that is, for analyses which until now could only be accomplished by chemical methods. The invention can also be used especially to determine, from oxygen consumption, the heating value of burnable gas mixtures.

The table below shows how the oxygen requirement of a quantity of a reactant and the heating value thereof are related. The table includes most of the important burnable components of flue gases. In the table column 1 shows the combustion reaction. Columns 2 and 3 show the high and low heating values of the components (the difference in the two values being the heat of condensation of water vapor). Column 4 shows the value of twice the volume of oxygen required for burning one volume of the component. Column 5 shows the ratio of high heat of combustion of each component to that of carbon monoxide and in column 6 is shown the ratio of low heat values of each to that of hydrogen.

| 1 Reaction | 2 High Value, kcal./Nm.³ | 3 Low Value, kcal./Nm.³ | 4 $\frac{V_{O_2}}{V} \times 2$ | 5 $\frac{H_o}{H_{o,CO}}$ | 6 $\frac{H_u}{H_{u,H_2}}$ |
|---|---|---|---|---|---|
| $CO + 1/2 O_2 = CO_2$ | 3,020 | | 1 | 1 | |
| $H_2 + 1/2 O_2 = H_2O$ | 3,050 | 2,570 | 1 | 1 | 1 |
| $CH_4 + 2O_2 = CO_2 + 2H_2O$ | 9,520 | 8,550 | 4 | 3.2 | 3.3 |
| $C_2H_6 + 7/2 O_2 = 2CO_2 + 3H_2O$ | 16,820 | 15,370 | 7 | 5.6 | 6.0 |
| $C_3H_8 + 5O_2 = 3CO_2 + 4H_2O$ | 24,320 | 22,350 | 10 | 8.1 | 8.7 |
| $C_2H_4 + 3O_2 = 2CO_2 + 2H_2O$ | 15,290 | 14,320 | 6 | 5.1 | 5.6 |
| $C_3H_6 + 9/2 O_2 = 3CO_2 + 3H_2O$ | 22,540 | 21,070 | 9 | 7.5 | 8.2 |

It is seen that there is a close relationship between the values of columns 5 and 6 and those in column 4. The table shows the oxygen requirements which can be and are measured, and are a practically obtainable quantity to use for indicating the heating values of the gas mixtures and indeed not dependent on them.

In the case of reactions where the shown relationship is not steady, but changes, the process is also applicable, so long as simultaneous reactions with marked different relationships between the oxygen requirements and heating values do not occur. The process is especially useful when only one definite known reaction takes place.

For an oxygen measurer, an instrument which works on magnetic principles is used. In such an instrument there are two sensing heated wires and two other comparison heated wires alternately connected in a bridge. The electrical resistance of the wires varies with temperature and the sensing wires are situated in an inhomogeneous magnetic field. When a para-magnetic gas comes in the vicinity of a sensing wire the wire is not only cooled by thermal convection but by "magnetic wind." At the comparison wire, which is exposed to the same gas or a comparison gas, the cooling is only by thermal action owing to the absence of a magnetic field. The difference in cooling of the sensing and comparison wires is then a measure of the amount of para-magnetic gas in the gas mixture surrounding the sensing wire. Since oxygen is the only para-magnetic gas of importance met with in industry, magnetic analysis is normally an indication of only oxygen content.

Since burning concerns an alteration of oxygen content of gas mixtures, the oxygen content change may be measured and instruments for determining heating content of gaseous mixture are not needed.

Figure 2:
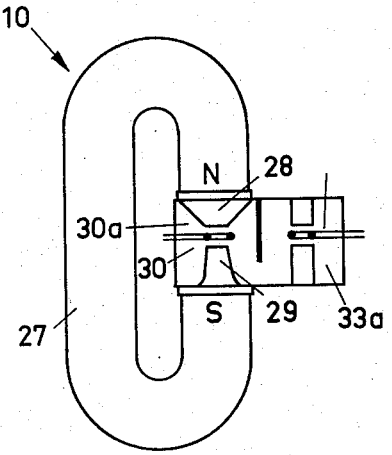
Figure 3:
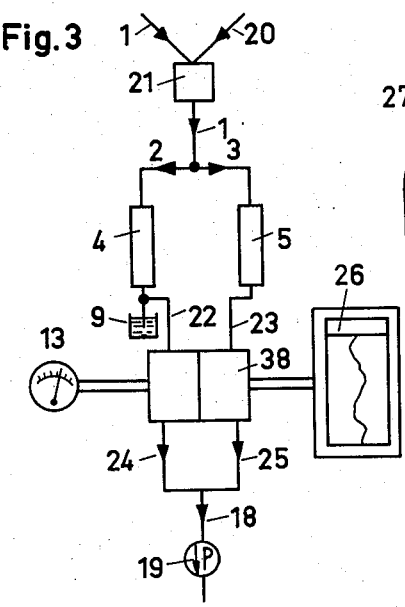
Figure 4:
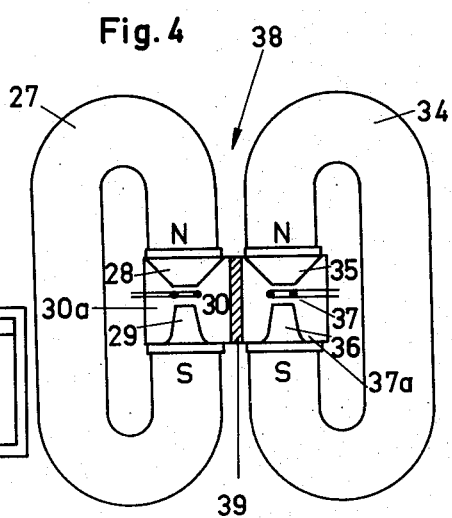

The invention is illustrated in the drawing wherein:

Figure 1 is a schematic representation of a system for indicating the oxygen content change in gas mixture, Figure 2 is a schematic representation of the oxygen measurer of Figure 1, Figure 3 shows a system similar to that of Figure 1 with another kind of oxygen measurer, and Figure 4 is a schematic representation of the oxygen measurer of Figure 3.

An instrument is shown schematically in Figure 1 for carrying out the inventive process.

The gas mixture for analysis is supplied from a line 1. The alteration in oxygen content takes place in a reaction chamber 4 where, for example, combustible gases are burned, the chamber 4 being connected to the line 1 by a branch 2. Another branch 3 from the line leads the gases to an equalizing chamber 5 which should make the conditions of flow the same in the two branches into which the line 1 is divided. The determination of the oxygen concentration is accomplished in a magnetic meter 10. With this meter, the oxygen concentration, in the original gas mixture and that in the mixture after the processing reaction, is alternately measured. To do this, a double switch or three-way valve V, having shiftable ducts 6 and 7 each connected to the reaction chamber 4 and equalizing chamber 5 respectively, selectively connect one of the chambers to the oxygen meter 10 at the inlet member 16 thereof. By-pass conduits 14 and 15 provide paths from the valve for the gas that does not flow through the oxygen meter 10. The by-pass conduits as well as an outlet member 17 from the oxygen meter are all connected to a common exhaust line 18 to which is connected a suction pump 19 for the transport of the gases. The oxygen concentration as sensed by the meter 10 may be indicated on an instrument 13, or recorded on a recorder 12. Conventional means, such as a connector 11 are preferably included with the recorder to indicate the position of the valve V whenever oxygen concentrations are recorded. The reaction chamber 4 may be tapped by a tube 8 to remove liquid components formed after combustion. The liquid is trapped in a container 9. An enriching conduit 20 may be connected to the gas mixture line 1 as shown in the drawing for adding oxygen or oxygen containing material, such as air, if the reaction in chamber 4 is such that oxygen is a reactant, and additional oxygen is required to accomplish reaction. This additional oxygen is usually required since normally the oxygen content in gases under question is too low to effect complete reaction. A mixing pump 21 is provided to insure a uniform percentage composition in the two gas streams. Of course the additional amounts of oxygen added must be taken into consideration. This may be done by making the usual potentiometer bridge nonsymmetrical so that this error is directly compensated. It can be considered as a "dilution error" and can be corrected by calibration. By the addition of the oxygen, reducing gas mixtures, containing no free oxygen, such as are produced in the ceramic and steel industries can be measured for heating content.

In this case, in a manner to suit, only such an amount of oxygen is added which gives the desired measuring range that is, the amount exceeds the highest prospective oxygen consumption. Since the oxygen content before the reaction is constantly noted there is adequate protection against false reading.

In order to obtain a sufficient accuracy it is desirable to have the measuring range as small as possible. A suppression or biasing for the measuring range should be provided therefore in considerable amounts when the instrument is operated without extra additions of gas intake.

In Figure 2 the essential features of the oxygen meter 10 are shown. A wire 30 serving as a sensing element and heated by a source of electrical current (not shown) is located within a chamber 30a and in the inhomogeneous field of a magnet 27 having poles 28 and 29. A similarly heated comparison wire 33 is disposed in a comparison chamber 33a but is in no magnetic field. The gas under question passes through both chambers 33a and 30a. Often two sensing wires and two comparison wires are used and correspondingly two measuring and two comparison chambers. With the arrangement as shown in Figures 1 and 2 the correct air draft can be determined from the investigation of flue gas as well as from the oxygen content of the flue gas, and their heating value.

Figure 3 shows a further developed form for carrying out the process of the invention. It differs from Figure 1 in that a differently developed oxygen meter 38 is used. The meter 38 measures directly the changes in oxygen concentration, having a connection 22 to the reaction chamber 4 for the spent gas mixture and a similar connection 23 for the unreacted gas mixture. The two mixtures are led off from the meter through conduits 24 and 25 respectively. The difference in oxygen concentration in these two mixtures can be shown on the scale of the instrument 13 or recorded on the recorded instrument 28. The scales of the instruments 13 and 28 can be calibrated to read directly in heating value. Like reference characters in Figure 3 corresponding to those in Figure 1. A switching valve is not necessary in Figure 3.

Figure 4 shows the essential features of the oxygen meter 38. The left half corresponds to the left portion of that shown in Figure 2, while the right half of Figure 4 is a comparison measurer having a magnet 34 with poles 35, 36 a measuring chamber 37a and a heated wire 37. No gas must flow between the two measurers and consequently a partition 39 divides the two. The two measurers may each be provided with comparison chambers such as 33a. This enables the original gas mixture to pass through two chambers, a magnetic measuring chamber and a non-magnetic comparison chamber, and the reacted mixture likewise.

According to Figure 3 the gases from the reaction chamber 4 pass through a measuring and comparison chamber and those from the equalizing chamber 5 pass through a similar pair and the four heater wires are connected into a bridge forming part of the instruments 13 and/or 28. In this manner the change of oxygen concentration can be determined as well as the heating value of the original gas.

With an instrument according to the invention for example the pollution of atmospheric air or other oxygen-containing gases due to a combustible gas or vapor such as benzene can be measured. For example in the determination of air pollution due to benzene according to Figure 3, fresh air, free from the pollution, is passed into and through the equalizing chamber 5. The polluted air is sent through a combustion tube to the outlet end of which there may be connected a carbon dioxide absorber for the precise determination of the hydrocarbons, and then subsequently led through the measuring chamber. The reaction for combustion is

$$2C_6H_6 + 15O_2 = 12CO_2 + 6H_2O$$

Thus it is that 1% by volume of benzene corresponds to about 7.5 decrease in oxygen concentration. This method is then sufficiently accurate.

The invention claimed is:

1. An instrument for determining heating values of a test gas subject to variations in molecular hydrogen, carbon monoxide and lower hydrocarbons content comprising a gas conduit connected to a source of said gas; an oxygen conduit connected to the gas conduit, means for mixing the gas and oxygen to form an oxygen mix; a combustion chamber and comparison chamber each provided with outlet means; means for dividing a stream of the mix between the chambers; a paramagnetic gas analyzer having at least one pair of heater elements, and responsive to the differences between the paramagnetic gas contents of the gases issuing from the respective chambers; and means for passing gaseous contents from the chambers to the analyzer, said analyzer being calibrated to read in terms of heating units, the calibrations being approximately proportional to said differences in paramagnetic gas content of said gases issuing from the chambers when the test gas contains a mixture of molecular hydrogen, carbon monoxide, and lower hydrocarbons.

2. An instrument for determining heating values of a test gas subject to variations in molecular hydrogen, carbon monoxide and lower hydrocarbons content and containing substantially sufficient oxygen for combustion thereof comprising a gas conduit connected to a source of said gas; a combustion chamber and comparison chamber each connected to the gas conduit and provided with outlet means; means for dividing a stream of the gas between the chambers; a paramagnetic gas analyzer having at least one pair of heater elements, and responsive to the differences between the paramagnetic gas contents of the gases issuing from the respective chambers; and means for passing gaseous contents from the chambers to the analyzer, said analyzer being calibrated to read in terms of heating units, the calibration being approximately proportional to said differences in paramagnetic gas content of said gases issuing from the chambers when the test gas contains a mixture of molecular hydrogen, carbon monoxide, and lower hydrocarbons with the oxygen.

References Cited in the file of this patent

UNITED STATES PATENTS

| | | |
|---|---|---|
| 1,681,047 | Porter | Aug. 14, 1928 |
| 2,603,964 | Foley et al. | July 22, 1952 |

FOREIGN PATENTS

| | | |
|---|---|---|
| 683,752 | Great Britain | Dec. 3, 1952 |